R. Greaves,
Spinning Machine.
No. 24,297. Patented June 7, 1859.
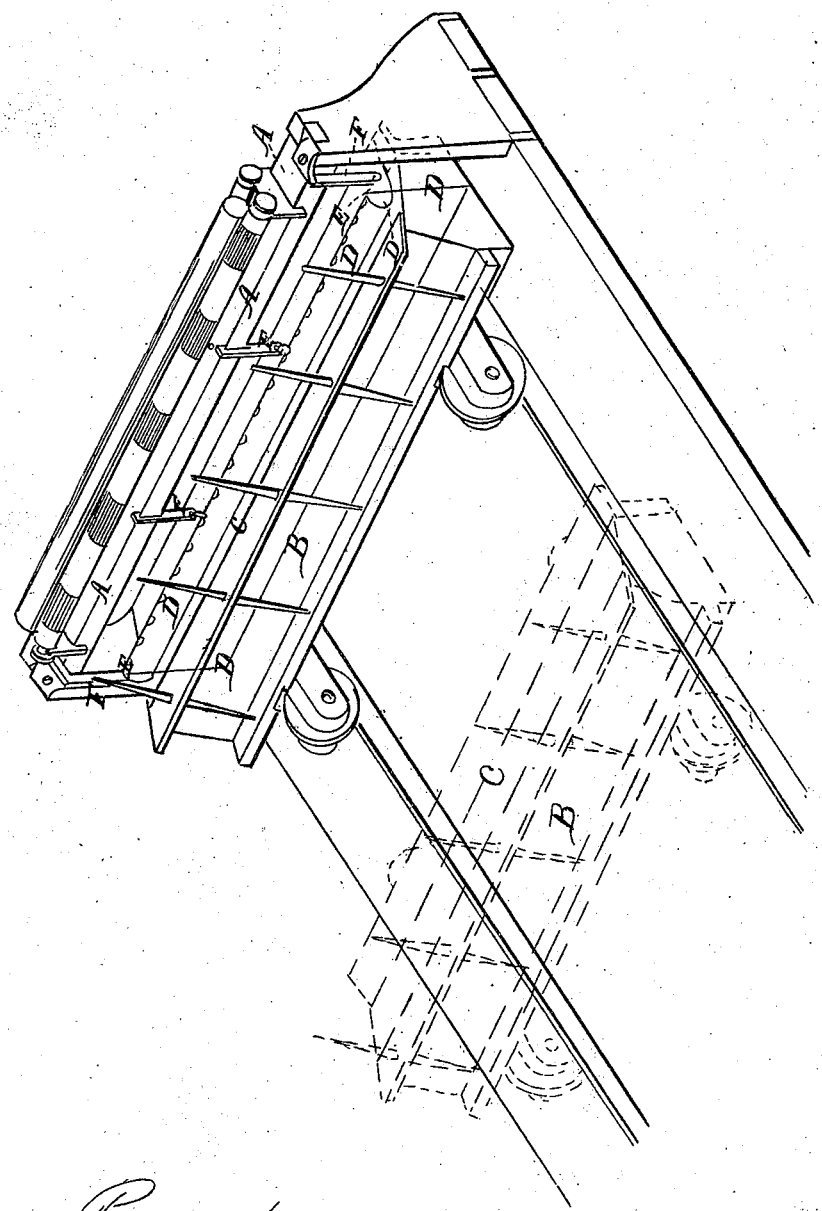
Signed in Presence of
J. Fletcher Bond
Edward Evans
Robert Greaves

UNITED STATES PATENT OFFICE.

ROBERT GREAVES, OF PHILADELPHIA, PENNSYLVANIA.

CLEANING SPINNING-MULE-CARRIAGE TOPS.

Specification of Letters Patent No. 24,297, dated June 7, 1859.

*To all whom it may concern:*

Be it known that I, ROBERT GREAVES, of the city of Philadelphia, in the county of Philadelphia and State of Pennsylvania, have invented a new and useful Improvement in Mules for Spinning Cotton, Wool, or other Fibrous Materials, of which the following is a full and exact description, reference being had to the annexed drawing and to the letters of reference marked thereon.

This invention relates to a new and improved self acting apparatus for removing the "fly" or loose particles of cotton (or other similar fibrous material) from the top board of spinning mule carriages, and consists in placing a cloth, (which I shall call a wiper) made of canton flannel (or other similar material,) in such a position, that as the mule carriage board travels to and from the roller beam, the said wiper shall collect, on its face, (or otherwise remove from the carriage top) all the "fly" that may have collected thereon, and which has heretofore been removed by manual labor.

To prevent confusion, only such parts of a mule are shown on the drawing, or named in this specification that are necessary and proper, to the full exposition of this invention, and to enable others skilled in the art to make and use my invention, I will proceed to describe its construction and operation.

The annexed drawing shows, or represents, a perspective view of a spinning mule with my improved wiper attached, on which—

A represents the roller beam.

B represents the spindle carriage and C the top board of carriage B.

D represents the improved wiper, which I prefer to be made of canton flannel, having a long nap on its surface, (other materials may be substituted therefor.) Said wiper D is suspended by a wire E, and carriers F, F, F, F, and said carriers being bolted to the front of roller beam A are stationary. The lower part of wiper D is not attached to anything, the wire above being sufficient to retain the wiper D in position. The wiper D and wire E extend from one end of roller beam A to the other, so that the whole length of carriage board C may be cleaned by the action of wiper D. The height and depth of wiper D must be arranged, so that when the carriage board C is immediately under the roller beam, the surface of wiper D will rest on and cover the said carriage board C. The drawing shows the position of wiper D when the board C has partially passed from under the wiper D. The dotted and red lines show the position of wiper when at rest, and the carriage "out" or away from the spindles.

The operation of the above is as follows: During the operation of spinning a large amount of loose particles of the material being spun flies off, and covers the board C, and when the said "fly" thus accumulates, it is absolutely necessary to remove the same. Now when the carriage board C approaches the roller beam, it will come in contact with the wiper D, and as the board C still presses forward, the whole surface thereof will be covered by the wiper D, and when the carriage board C commences to leave the roller beam A the wiper D gradually rolls off the board C, taking with it all the loose fly that may have fallen thereon. This operation is of course repeated every time the carriage travels backward and forward, thus keeping the carriage top C perfectly free from fly. The fly that is thus collected on the surface of wiper D may be removed two or three times per day as circumstances may require.

Some of the advantages derived by the use of this invention may be briefly stated as follows: First, safety to life and limb. It is now usual in cotton and other similar mills to employ boys of from ten to twelve years of age to "scavenge" or clean off the mules. The most dangerous part of their duty is when removing the "fly" from the carriage top while in operation (especially in self acting mules) for the boy must first creep under the roller beam, and then (in a stooping posture) with a brush or cloth in hand must run a considerable distance along, and remove the fly from the carriage top, and having performed that duty he must instantly return to the back part of the mule. Should he be a few seconds too long in performing this duty, he would assuredly be caught between the carriage and roller beam. There are numerous instances on record where death has resulted from such accidents. Secondly, the yarn being spun with this improvement connected with the mule, proves to be of better quality in consequence of the fly being so frequently and effectually removed. Thirdly, economy. The scavenger's duty so far as concerns the cleaning off the carriage top is at an end, and further the fly itself is gathered in better order, and actually commands a higher price in the market than formerly.

Having now fully stated the nature of my invention, the mode of operation, and advantages of the same, I wish it to be understood, that I do not limit myself to the precise form of the parts, as they may be altered to suit the various kinds of machinery, without deviating from the principle of my invention as herein described.

What I claim as my invention and desire to secure by Letters Patent, is—

The within described mode of cleaning mule carriage tops or any mechanical equivalent therefor.

ROBERT GREAVES.

Witnesses:
JOSEPH ENEN.
JAMES ECCLES.